May 14, 1935. J. S. PECKER 2,000,904
ROTARY WINGED AIRCRAFT
Original Filed Jan. 4, 1932 4 Sheets-Sheet 1
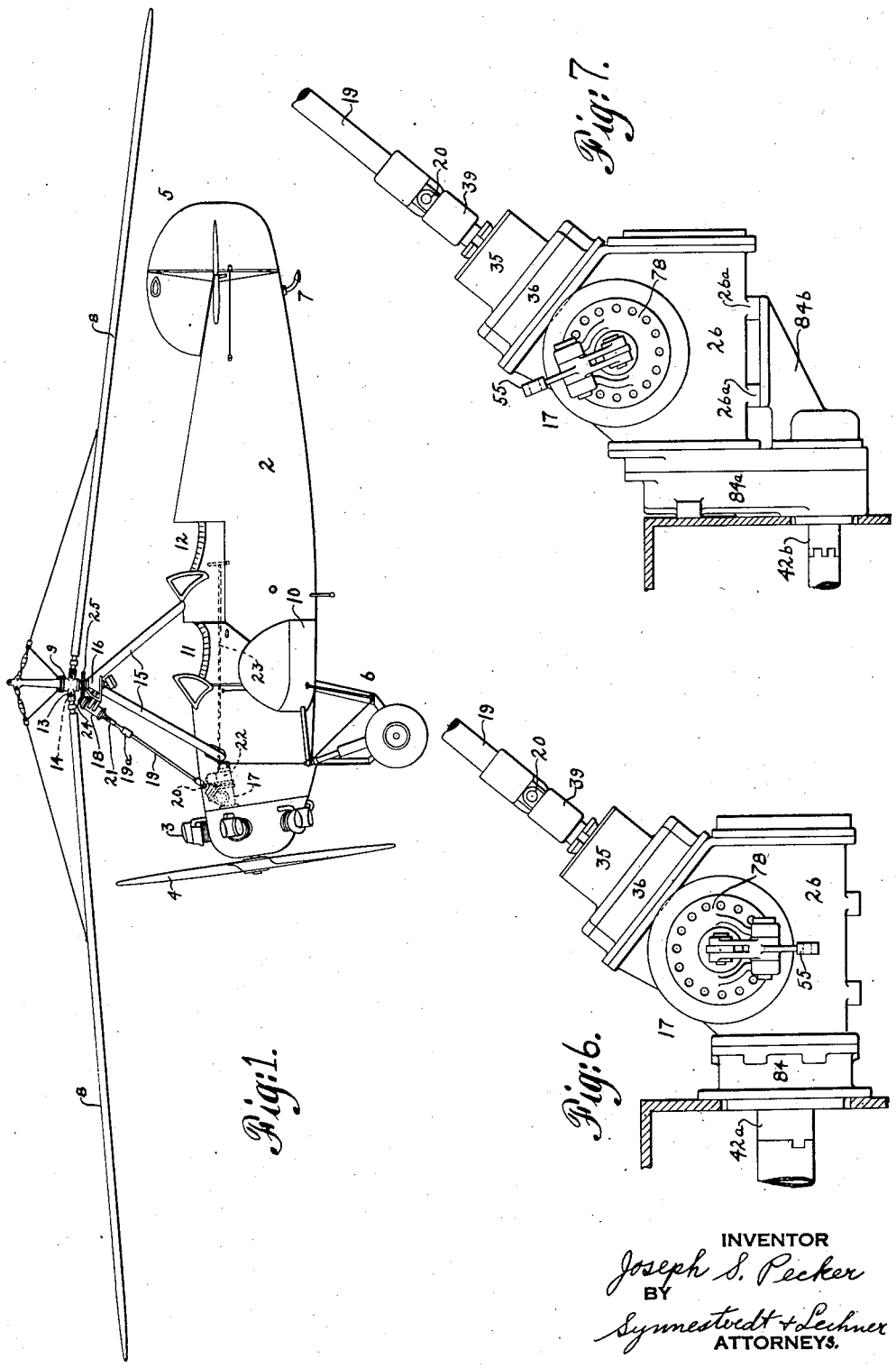
INVENTOR
Joseph S. Pecker
BY
Synnestvedt + Lechner
ATTORNEYS.

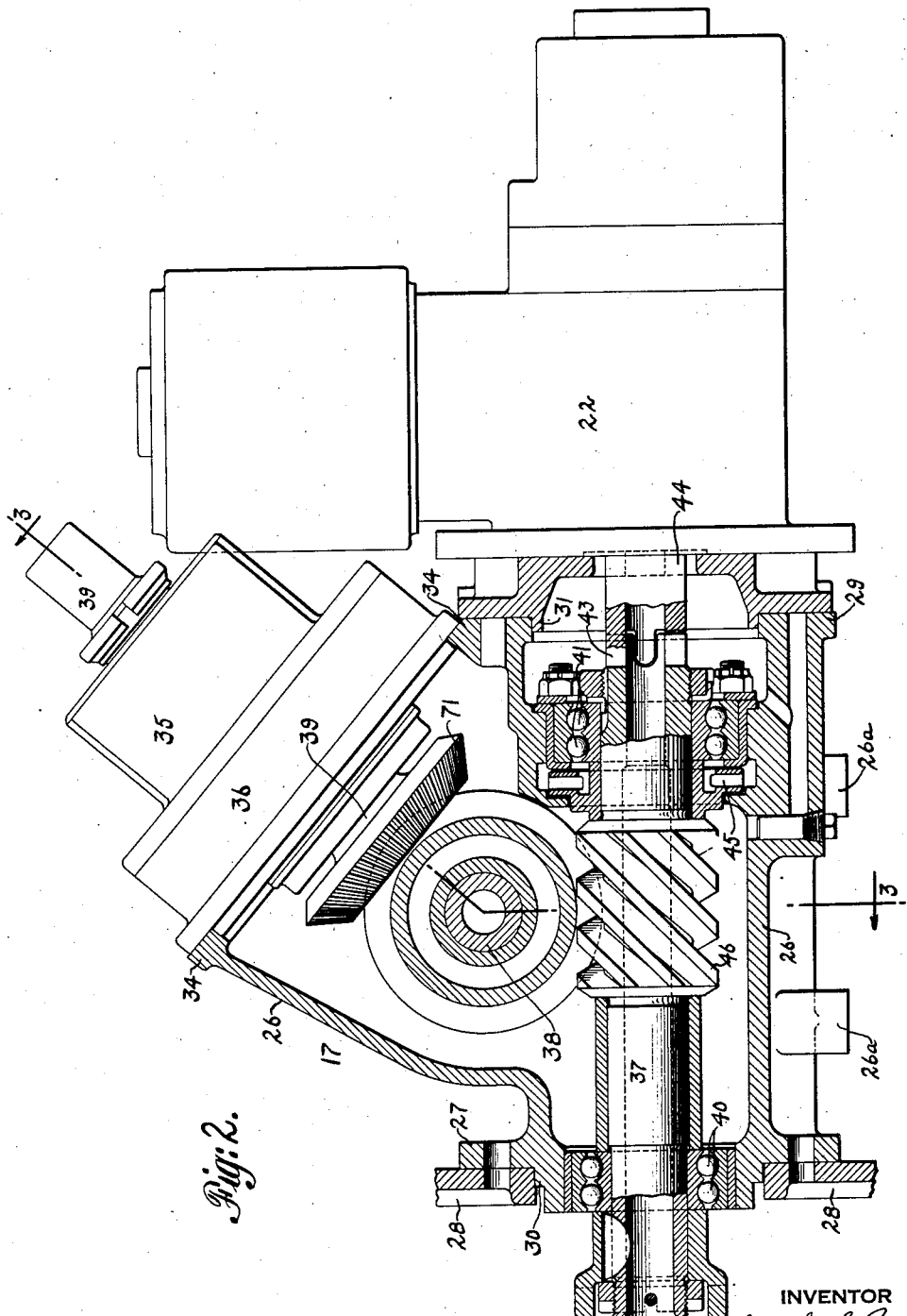

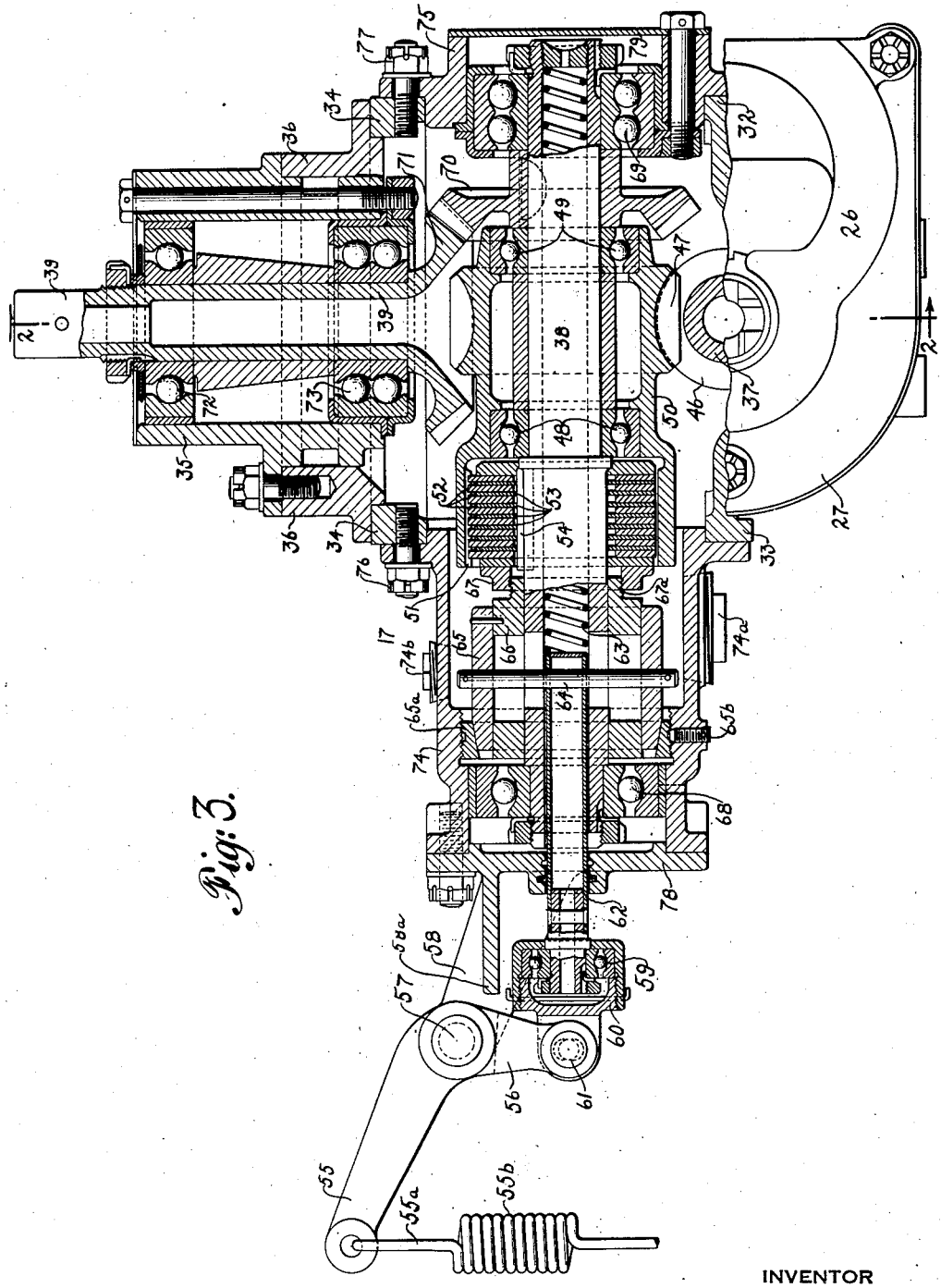

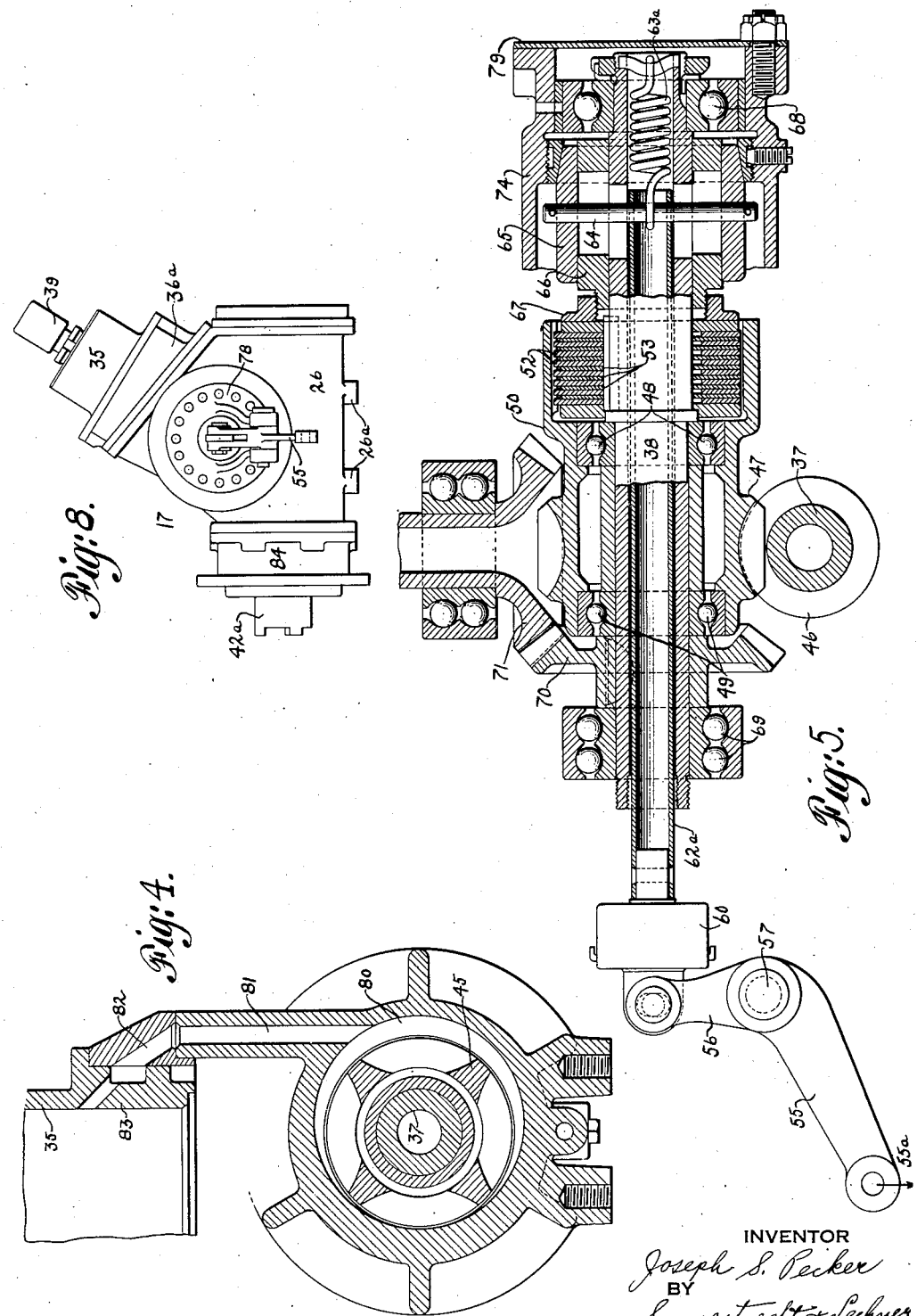

Patented May 14, 1935

2,000,904

UNITED STATES PATENT OFFICE 2,000,904

ROTARY-WINGED AIRCRAFT

Joseph S. Pecker, Philadelphia, Pa., assignor to Autogiro Company of America, Philadelphia, Pa., a corporation of Delaware Application January 4, 1932, Serial No. 584,641
Renewed July 23, 1934

46 Claims. (Cl. 244—19)

This invention relates to rotary-winged aircraft, and is particularly concerned with drive mechanism for the rotors of such craft, useful especially in starting a normally air-driven rotor prior to take-off.

Before considering in detail the objects and advantages of the present invention, a clear comprehension of some of the difficulties encountered in practice should be had. One of the major practical difficulties in this art is the problem of utilizing a rotor drive or starting mechanism in conjunction with, or adapting it to, various types of engines of varying size, power and rotational speed, various types and sizes of rotors, various positions for mounting rotors upon the machines themselves, and various angles between engine axis and rotor axis. In this connection, it will be readily understood that different types of rotative-winged aircraft will require different power plants and different rotor constructions and rotor mounting, and even in a given type of craft, purchasers may desire different engine installations. Thus a variety of different rotor drive or starting mechanisms has heretofore been almost essential.

Another difficulty encountered in practice arises from the fact that the rotor is ordinarily arranged for rotation in a given direction, whereas in different engines the shaft or shafting from which the rotor starter is driven may rotate in different directions.

Other difficulties encountered in practice include the difficulty of fitting in the starter mechanism with the other parts of the craft without encroaching excessively on available space; arranging the operating mechanism for the starter in such manner as to prevent interference with other control devices or parts; arranging the starter mechanism which is mounted at the rear of the engine in such manner as to provide proper clearance for the engine starter, magnetos and the like; and providing a firm and compact mounting for the rotor starter without excessive overhang of the starter or other parts mounted on the engine.

With the foregoing in mind, the present invention contemplates a substantially universal application or adaptation of the rotor starter or drive mechanism of a given type, while at the same time reducing the overall size, weight and cost of the rotor-starter mechanism.

More specifically, the invention comprehends a rotor-starter construction which is substantially universal with respect to the angularity between the engine shaft and the rotor axis, with respect to the directions of rotation of the engine shafting and the rotor, with respect to right and left-hand locations of the starter-operating means such as clutch and control lever, with respect to adaptation to location of engine auxiliaries and other parts, with respect to cooperation with different types of engine starters, and with respect to different rates of rotation of and power to be applied to various rotors.

Still more specifically, the present starter mechanism contemplates adaptability to different starter-shaft angles, as by the ready substitution of various "adapters" which are in the form of differently angled casing plates or covers through which the starter shaft extends. Similarly, for the mounting of the primary unit of the starter upon the power plant, I interpose, when needed, a very simple mounting element, which in one case may include a reversing gear, in another case a reducing gear, and in other cases other elements, such as a shaft extension. Any of these changes may be readily effected without altering the internal construction or operation of the starter mechanism per se, in any way.

Furthermore, a number of the parts of the primary-starter unit are reversible with respect to other parts or with respect to the main casing of the said unit, for example: the starter clutch, and the starter actuating lever. In other words, certain parts may as readily be inserted into one side of the starter casing as into the other, for the purposes specified or for other reasons which may appear.

In combination with the foregoing, the invention contemplates a greatly simplified structure, including means of lubrication, greater ease of manufacture and assembly, lower weight and cost, easy servicing and other specific advantages which will hereinafter appear or which are incident to the invention.

Referring now to the drawings:

Figure 1 is a side elevational view of an aircraft of the air-rotated-wing type, embodying the rotor drive mechanism of the present invention, including a lower, driving, or primary unit of the drive or starter mechanism and the upper, driven or secondary unit of said mechanism;

Figure 2 is an enlarged side elevational view of the lower unit of Figure 1, showing parts of the operating mechanism thereof in vertical longitudinal section, and illustrating the manner in which such unit may be directly interposed between the aircraft engine and the engine starter, said starter being shown in elevation, this view being taken generally on the line 2—2 of Figure 3;

Figure 3 is an irregular sectional view of the lower unit on the line 3—3 of Figure 2, showing certain parts in elevation and illustrating one form of torque limiting device;

Figure 4 is an irregular sectional detail through the lubricating mechanism embodied in the construction of Figures 2 and 3;

Figure 5 is a fragmentary sectional view similar to Figure 3, illustrating a different arrangement of some of the internal and operating parts of the mechanism, whereby the device may be adapted to a different location;

Figure 6 is a side elevational view of the primary unit of the starter of the foregoing figures, illustrating the application of an engine adapter thereto, for the purpose of applying the starter mechanism to an installation having a different type of aircraft engine;

Figure 7 is a view similar to Figure 6, but illustrating a different form of adapter device; and Figure 8 is a view similar to Figures 6 and 7, showing the engine adapter of Figure 6 and a modified form of starter-drive-shaft adapter, by which the drive shaft between the primary and secondary rotor-starter units may be run upwardly at a different angle from that shown in the other views of the drawings, the particular difference in angle being, of course, merely illustrative, as any desired difference may be provided for.

By reference first to Figure 1, it will be seen that I have illustrated an aircraft having a body or fuselage 2, engine and propeller 3, 4, empennage indicated at 5, landing mechanism 6, 7, primary means of sustension comprising rotative wings or blades 8 mounted to rotate freely on a hub member 9, supplemental fixed wings 10, and passenger's and pilot's cockpits 11, 12. In the type of aircraft shown, the rotor hub 9 is provided with horizontal and vertical pins 13 and 14 for the free articulation of the wings and is mounted to be normally freely rotated by relative air-flow on the wings, said mounting including a supporting structure such as pylon legs 15 and apex mechanism 16.

For imparting an initial rotation to the rotor, prior to take-off, I provide a rotor-starter mechanism comprising a lower or primary unit indicated at 17, which is directly secured to the rear face of the engine 3 as shown, an upper or secondary unit indicated at 18, and an interconnecting drive shaft 19 having a slip-joint 19a and universal or flexible joints 20 and 21. The lower or primary-starter unit has provision at the rear thereof for the mounting of an engine starter indicated at 22; and for the operation of the rotor-starter clutch I preferably provide an operating rod 23, extending from said lower unit back to the pilot's cockpit 12.

The internal construction of the upper unit 18 need not here be shown, as it may comprise an over-running mechanism similar to that shown in my copending application Serial No. 512,383, filed January 30th, 1931. The connection of this unit to the rotor hub, however, is by means of a spiral-beveled pinion and gearing indicated at 24, 25. Before passing to a detailed description of the lower or primary-starting unit, I wish to point out that I employ the said spiral-beveled gearing as an ultimate connection to the rotor primarily for the following purpose, to-wit: Since the upper unit 18 is rigidly mounted on the apex construction 16, and since the rotor hub 9 is movably mounted thereon, a certain amount of weaving, play or lost motion occurs between the driving and driven gears 24, 25. Such motion is primarily a slight relative rocking motion, and I have found that by the use of such spiral-beveled gears, such unavoidable relative motion can be taken care of without hindering the proper delivery of power thru the gearing.

By reference now to Figures 2, 3 and 4, it will be seen that the primary rotor-starter unit, indicated generally at 17, is chiefly housed within a main casing structure 26, such casing having a front flange 27 which may be directly secured to the rear casing wall 28 of the engine 3, and a rear face or flange 29, to which may be directly secured the engine starter 22; the shoulder 30 at the front end of the casing 26 fitting the opening in the engine wall 28 in the position which would normally be occupied by the flange 31 of the engine starter were the rotor starter not employed.

In addition to the foregoing, the casing 26 of the rotor starter is provided with right and left-hand openings defined by the rims or flanges 32, 33 (see Fig. 3), for the insertion, from either side, of various internal and operating parts, and for the securing of such parts in place, as will be further described hereinafter.

Still further, the casing 26 has an opening or aperture at the top, as best seen in Figure 2, with its surrounding edge or flange 34 set at an angle, for the reception and support of the bearing housing 35 of the obliquely disposed drive shaft 19; said bearing housing 35 being mounted on and secured to the flange 34 through the intermediation of an adapter member or supplemental casing 36, the purpose of which will be described in greater detail as the specification proceeds.

Consonant with the foregoing general arrangement, the operating parts of the starter mechanism are disposed for rotation on three general axes: First, a longitudinal or fore and aft axis, represented generally by the shaft 37; second, a transverse axis represented generally by the shaft 38; and third, an upwardly, and in this case obliquely rearwardly, directed axis represented generally by the shaft 39.

Speaking again in general terms, the shaft or axis 37 is the driving shaft of the unit, and is further employed, in conjunction with other parts, to adapt the unit to various engine and engine-starter arrangements. The shaft or axis 38 may be termed the driven shaft of the unit, clutchable and declutchable with respect to the driving shaft, as will hereinafter be set forth, and serving with associated parts as the mechanism for altering the location and disposition of the starter clutch, operating lever, etc., and further, if desired, as a means for reversing the direction of drive for rotors of different senses of rotation. The shaft or axis 39 is the means for taking off the driving power, and serves the purpose, in conjunction with certain adapters hereinafter to be described, of providing for various angularities of the starter shaft extending up towards the rotor.

Referring specifically to Figure 2 and to shafting 37, it will be seen that this shafting is mounted in front and rear bearings 40 and 41. Ahead of the front bearings is provided a means of engagement with the usual auxiliary shafting (not shown) of the engine, which ordinarily takes the drive of the engine starter. Such means of engagement is indicated generally at 42. Behind the rear bearings 41 the shafting 37 is provided with means of engagement indicated generally at 43, for connection with the engine-starter shaft 44. Intermediate the forward and rear bearings the shaft 37 carries an oil pump 45 and a spiral worm-like gear 46. Meshed with this gear, as seen in Figure 3, is a gear 47, mounted concentric with transverse shaft 38, by means of the bearings 48, 49 and sleeve or driving cup 50.

The driving cup 50 internally in provided with driving lugs or splines 51 engaging multiple disk clutch elements 52. Cooperating clutch elements 53 are secured to the shaft 38 as by means of lugs or splines 54. By utilizing a multiple-disc clutch and mounting it concentric with the tubular transverse shafting I am enabled to obtain the necessary rotor starting effort (about ¼ of available engine H. P.) by mechanism of extremely small diameter; the entire clutching mechanism being small enough to be slipped into the casing extensions 74, 75, placed at either side of the unit.

As seen in Figure 3, by a downward pull on the clutch-operating arm 55 (which may be connected by cable and spring 55a, 55b, through suitable links, levers or the like to the clutch control 23 of Fig. 1) the lever arm 56 is moved inwardly, since the lever 55 is pivoted at 57 on the fixed bracket member or members 58.

Through the intermediation of the bearing 59, the split bearing housing 60, which is pivotally connected at 61 to the arm 56, moves the clutch tube or operating member 62 inwardly against the pressure of the releasing spring 63, and this motion is transmitted to the clutch by means of the pin 64, sleeve 65 and collars 66 and 67. The whole clutch assembly is then in driving relation, with the drive being transmitted from cup 50 to shaft 38, said shaft being mounted at its ends in bearings 68, 69. Fast on the shaft 38 is a beveled gear 70 which meshes with the gear 71 formed at the lower end of the angular shaft 39 which is carried in its housing 35 by means of the bearings 72, 73. This completes the drive to the point of connection to the main starter shaft 19. The pressure on the clutch, and thus the torque delivered, which should be predeterminedly limited, may be set by the choice of a suitable spring 55b in the operating connection, which will yield after a given pull is exceeded. The spring may be so chosen that its elongation may continue, under an excessive pull on the control lever in the cockpit, after engagement of arm 56 with fixed stop 58a.

Access to the inside of casing member 74 for inspection and servicing may be had by removal of plugs 74a and 74b (Fig. 3); and adjustment of the clutch for wear may be readily made, after removal of pin 64 through one of the plug apertures, by relative adjustment of collars 66 and 67 which are threaded together at 67a. Upon release of the clutch, a braking action is produced by engagement of the sleeve 65 with tapered collar 65a, and it will be noted that the brake action may be adjusted by releasing set-screw 65b and turning the ring or collar 65a.

Attention should now be called to the fact that the mounting of all of the parts associated with the transverse shaft or axis is by means of the housing extensions or bearing supports 74, 75, which are secured as by bolts 76, 77 to the flanges 33 and 32 of the main housing structure 26; the closure of the outer end of the casing extension 74 being accomplished by means of the cap member 78 which serves also as a support for the bracket 58 carrying the clutch-operating arm, and the closure of the housing extension 75 being accomplished by the cap member 79.

The lower part of the casing of the mechanism shown in Figures 2 and 3 is preferably filled with oil, which is circulated by the pump 45 in the manner illustrated in Figures 2 and 4. Said pump may comprise a small rotary toothed element, positioned eccentrically in a cavity 80, from which, upon rotation, it forces oil up through a passage 81, which may deliver through passages 82 and 83 into the bearing housing 35 of shaft 39. From thence the oil may drain back, through the bearings 73 and over the various gears, into the lower part of the casing.

In the arrangement of Figure 3, the clutch-operating arm is at the left of the structure, and the connections from said arm back to the cockpit may be arranged for operation at the left side of the cockpit. By completely reversing the assembly of parts mounted in the casing extensions 74 and 75, the clutch-operating arm may be taken off at the right, which is the position of the parts shown in the dotted-line showing of Figure 1. In other words, the extension 75 may be mounted in the opening defined by flange 33 at the left of Figure 3, and the casing extension 74 may be mounted in the opening defined by the flange 32 at the right of Figure 3, all the parts associated with the transverse axis being accordingly reversed.

In Figure 5, I have illustrated such portions of the apparatus of Figure 3 as are necessary to illustrate how the location of the clutch may be reversed as compared to Figure 3, while still maintaining the clutch-operating lever 55 at the left-hand side, this arrangement thus being different from the arrangement of the device either as shown in Figure 3 or as shown in Figure 1. Figure 5 also illustrates a reversal of the arrangement of gear 70 with respect to gear 71, which may be used where the engine shaft from which starter shaft 37 is operated rotates in a counter-direction as compared with the rotation of the engine shaft for the installation as shown in Figure 3. In the arrangement of Figure 5 (as compared with Figure 3) the shaft 38, its bearings 68 and 69, and the housings 74 and 75 (only one of which is shown), the clutch and gear sleeve 50, the gear 70, and the clutch-operating parts 64, 65, 66 and 67, are all reversed in position; but the two cover plate members 78 and 79 (only one of which is shown) are located in the same positions as in Figure 3. The clutch-operating lever 55 is also retained at the left, as in Figure 3, but is turned through 180° as compared with Figure 3, which is done, of course, by turning the cover plate 78 of Fig. 3 around through 180°, the bearings in the housing 69 permitting such change as they also provide for the rotation of the clutch parts during driving. A pull in the direction of the arrow 55a, which is the same direction as shown in Figure 3, moves the arm 56 outward instead of inward, and I therefore substitute operating tube 62a for the tube 62 of Figure 3, and a tension spring 63a in place of the compression spring 63 of Figure 3. It will thus be seen that the hollow transverse shaft 38 and the association of the clutch operating tube and spring therewith make for very ready reversal of location of the clutch and the clutch operating arm.

By the foregoing arrangement of the mechanism, the clutch and some of its associated parts are disposed at the right-hand side, in an installation where available space on the left-hand side must be used for other apparatus.

By reference now to Figure 6 it will be seen that I have interposed an engine adapter 84 between the main casing 26 and the rear of the engine, which adapter may enclose an extended shaft connection 42a, for use either for clearance purposes where the unit 17 must be placed farther back from the engine than shown in Fig. 1, or where the internal construction of the engine employed is such that an extension of the connection 42a or a different type of connecting member is needed, or where a different flange is needed for mounting the unit on the engine, to suit the normal construction of various engines. All the parts of the rotor-starter unit itself are in this construction retained in the same condition and relation as that shown in Figure 2.

In Figure 7 I disclose still another engine adapter, indicated at 84a, having an engine connection member 42b. This adapter may provide for take-off of power from a different shaft of the engine, such for example as a lower shaft, while maintaining the casing 26 of the unit 17 at the same height as before; or it may provide for raising the unit or for offsetting it laterally to one side or the other, depending upon the contour of the adapter 84a, and by utilizing various gearings in the adapter, such as reduction gears, or other gears of different ratios, I may adapt the device to engines of various power, or to the transmission of different amounts of power from a given engine to rotors of various sizes. Alternatively, the adapter 84a may be utilized as a gear box for a reversing gear, either to care for a reversal in the direction of turning of the particular engine or engine shaft, or to provide for a rotor installation of reverse contour if desired, or still further in order to alter the relative locations of the gears 70 and 71 of the unit without any change in the ultimate direction of rotation of the shaft leading to the rotor, or for adapting the starter to mounting on an engine having a small diameter shaft aperture or to an engine having magnetos closely spaced on each side of the shaft.

The arrangement of Figure 7 further makes it conveniently possible to move back the rotor-starter unit, and still obtain adequate support therefor, as by means of the extension bracket 84b, which cooperates with the supporting or base lugs 26a of the casing. I have also here illustrated the rotor-starter-clutch lever 55 as being taken off at a different angle, to suit conditions encountered in a particular installation, such arrangement of the clutch lever at any desired angle being possible by merely mounting the cover plate member 78 in different positions.

It will be readily understood that adapters of the type shown in Figures 6 and 7, for example, may also be utilized in order to provide proper clearances either below the starter unit or to one side or the other thereof for the mounting of magnetos, engine starters or the like, back of the engine.

By reference now to Figure 8, it will be seen that the installation is the same as in Figure 6, with the exception that I have substituted a different starter-shaft adapter 36a in place of the adapted 36 of Figure 6. This adapter is irregularly angled at top and bottom, so as to effect a mounting of the starter-shaft-bearing housing 35 at a different angle, to care for differences in angularity between the engine shaft and the rotor axis. By comparing Figure 8 with Figures 2 and 3, it will be evident that this change in angle is very readily accomplished, since the gear 71 is mounted on an axis intersecting the axis of gear 70, and one gear may simply roll around the other as the angle of the shaft is altered. In this connection it should be noted that the opening defined by the flange 34 (Fig. 2) is large enough to provide for a considerable alteration in angle of the shaft 39, and this, by modification of the size, contour or angularity of the aperture may even provide for vertical extension of the drive shaft. Since some degree of angularity may be taken care of by universal joints 20 and 21, the number of adapters necessary for shaft-angle change need not be large; variations in angle needed, between the take-off angle of one adapter and the take-off angle of another adapter, being taken care of by the universal joints.

By way of general summary, it will be seen that with a rotor starter arrangement which may be made of standardized parts, there is provided ready adaptation to rotors of different sizes, speeds and senses of rotation, engines of various types (for example, in-line and radial) different powers, different senses of rotation, and various angularities between engine and rotor, and different location in mounting of engine accessories, by the mere reversal of certain of said standard parts or by the replacement of adapter devices cooperating with such standard parts. In addition, the rotor starter may be altered in its position relative to the engine, since the substitution of engine adapters, for example, may readily provide for mounting the lower unit of the starter at different heights, or laterally to one side or the other. Furthermore, the construction of the lower unit with longitudinal shafting for connection to the engine, upwardly extending shafting for connection with the rotor, and transverse shafting as an intermediate between the first two shaftings, makes the device extremely compact, renders it easy to reverse the bearing, gearing, clutch, and operating mechanisms very easily, and provides for inspection, withdrawal and replacement of parts without dismounting the casing, or taking down the rotor starter construction as a whole.

I claim:—

1. In a rotative-wing aircraft, a rotor, a rotor-starter unit, a driving connection for transmitting power from said unit to the rotor, and a replaceable adapter device, cooperating in such manner that different conditions imposed by the rotor construction may be compensated for by replacement of the adapter device.

2. For aircraft having a prime mover and a sustaining rotor, drive mechanism arranged to transmit power from the prime mover to the rotor and adapted for association with different prime mover and rotor combinations of various characteristics, said mechanism including standard driving parts constituting the major portion of the driving interconnection, and replaceable adapter means for accommodating the standard driving parts to the varying characteristics of the different prime mover and rotor combinations of different craft.

3. For aircraft having a prime mover and a sustaining rotor, drive mechanism arranged to transmit power from the prime mover to the rotor and adapted for association with different prime mover and rotor combinations of various characteristics, said mechanism including standard driving parts constituting the major portion of the driving interconnection, and means for altering the relation of certain of said standard parts whereby to accommodate the driving mechanism to the varying characteristics of the different prime mover and rotor combinations of different craft.

4. In an aircraft having a forward propulsion engine and propeller and a sustaining rotor above the propeller constituting the primary means of sustension for the craft, a rotor starter adapted to be mounted adjacent the engine, a longitudinal shaft adapted for connection with the engine, a transverse shaft adapted for driving connection with the longitudinal shaft and having an ultimate shaft connection, a major part of which is upwardly extended to the rotor hub for driving purposes, and mechanism for connecting and disconnecting one of said shafts from another thereof.

5. In an aircraft having a forward propulsion engine and propeller and a sustaining rotor above the propeller constituting the primary means of sustension for the craft, a rotor starter adapted to be mounted adjacent the engine, a longitudinal shaft adapted for connection with the engine, a transverse shaft adapted for driving connection with the longitudinal shaft and having an ultimate shaft connection, a major part of which is upwardly extended to the rotor hub for driving purposes and mechanism for connecting and disconnecting one of said shafts from another thereof, the last mentioned mechanism including a clutch device associated with said transverse shaft.

6. In an aircraft having a forward propulsion engine and propeller and a sustaining rotor above the propeller constituting the primary means of sustension for the craft, a rotor starter adapted to be mounted adjacent the engine, a longitudinal shaft adapted for connection with the engine, a transverse shaft adapted for driving connection with the longitudinal shaft and having an ultimate shaft connection, a major part of which is upwardly extended to the rotor hub for driving purposes and mechanism for connecting and disconnecting one of said shafts from another thereof, the last mentioned mechanism including a clutch device associated with said transverse shaft, and gearing connecting the shafts, one of the gears of which is rendered operative or inoperative at will by said clutch.

7. In an aircraft having a forward propulsion engine and propeller and a sustaining rotor above the propeller constituting the primary means of sustension for the craft, a rotor starter adapted to be mounted adjacent the engine, a longitudinal shaft adapted for connection with the engine, a transverse shaft adapted for driving connection with the longitudinal shaft and having an ultimate shaft connection, a major part of which is upwardly extended to the rotor hub for driving purposes, and mechanism for connecting and disconnecting one of said shafts from another thereof, the last mentioned mechanism including a clutch device associated with said transverse shaft, and gearing connecting the shafts, one of said gears being clutchable to said transverse shaft by said clutch.

8. In combination a prime mover and an aircraft sustaining rotor, a clutch-and-driving-unit interposed between the prime mover and the rotor including driving connections with said prime mover and said rotor, and replaceable means for altering the relative position of said unit and said prime mover.

9. In combination a prime mover and an aircraft sustaining rotor, a clutch-and-driving-unit interposed between the prime mover and the rotor including driving connections with said prime mover and said rotor, and replaceable means for altering the relative position of said unit and said rotor.

10. In combination a prime mover and an aircraft sustaining rotor, a clutch-and-driving-unit interposed between the prime mover and the rotor including driving connections with said prime mover and said rotor, and replaceable means for altering the angularity of the connection between said unit and said rotor.

11. In combination a prime mover and a rotor constituting a primary means of sustension for an aircraft, a clutch-and-driving-unit interposed between the prime mover and the rotor including driving connections with said prime mover and said rotor, means for reversing the direction of rotation of said connection to the rotor, and means precluding such reversal in flight.

12. In combination a prime mover and a rotor constituting a primary means of sustension for an aircraft, a clutch-and-driving-unit interposed between the prime mover and the rotor including driving connections with said prime mover and said rotor, means for accommodating said unit to engine shafts rotated in different directions regardless of the desired direction of rotation of the connection to said rotor, and means precluding change in direction of rotation of the last mentioned connection in flight.

13. A rotor starter including a power take-off shaft for connection with a prime mover, a power delivery shaft for connection with an aircraft rotor, and a mechanism for connecting said shafts, including a reversible gear.

14. A rotor starter including a power take-off shaft for connection with a prime mover, a power delivery shaft for connection with an aircraft rotor, and a mechanism for connecting said shafts, including a gear reversible in position whereby relative direction of rotation of said shafts may be reversed.

15. In rotor starter mechanism of the character described, a lower or driving unit including shafting and gearing for actuation by a prime mover, driven shafting and gearing for connection with the rotor, said two shaftings being disposed substantially within the same general plane, and shafting and gearing for connecting the gearings of the two first mentioned shaftings, said last mentioned shafting being extended generally transverse said general plane and having a clutch device associated therewith at one side of said plane, and means for supporting the last mentioned shafting and gearing in such manner as to provide for inversion thereof to position said clutch device at the opposite side of said plane.

16. A rotor starter including a power take-off shaft for connection with a prime mover, a power delivery shaft for connection with an aircraft rotor, transverse shafting having gearing connecting the same with the take-off and delivery shafts, and a clutch mechanism adapted to engage and disengage one of said gears on said transverse shafting, said clutch mechanism and a gear connected with the delivery shaft being reversible in position relative to each other.

17. For a wind driven aircraft sustaining rotor, a rotor starter device including driving mechanism adapted for connection with the rotor and a prime mover, means of disconnection of the mechanism at an intermediate point, and movable lubricating means for the mechanism having driving means actuated from a part having constant connection with the prime mover, whereby said lubricating mechanism is effective with the rotor starter connected or disconnected.

18. In an aircraft rotor-starter mechanism, a lower or primary unit including a casing, means of take-off of power from a prime mover, means driven thereby and arranged to deliver power to the rotor, said two means including shafting, bearings therefor and gear interconnections, and a common means for forced feed lubrication of said gears and said bearings.

19. In an aircraft rotor-starter mechanism, a lower or primary unit including a casing, means of take-off of power from a prime mover, means driven thereby and arranged to deliver power to the rotor, said two means including shafting, bearings therefor and gear interconnections, and means for forced feed lubrication of said gears and bearings, said lubricating means including an oil pump located on the power shaft connected to the prime mover.

20. In an aircraft rotor-starter mechanism, a lower or primary unit including a casing, means of take-off of power from a prime mover, means arranged to deliver power to the rotor, intermediate means forming a driving connection between the first two means, said three means including shafting, bearings therefor and gear interconnections, means for forced feed lubrication of said gears and bearings, said lubricating means including an oil pump associated with the power shaft connected to the prime mover, and clutch mechanism for connecting and disconnecting other driven parts of the mechanism, whereby lubrication is assured whether the clutch be connected for drive or not.

21. In rotor-starter mechanism of the character described, a lower or primary unit adapted for connection with a prime mover, and an upper or secondary unit having flexible driving connection with the lower unit, a rotor pylon supporting the rotor and said upper unit, and spiral-bevel gearing connecting said upper unit and said rotor, whereby weaving and play may take place without disturbing the driving connection to the rotor.

22. In rotor-starter mechanism for an aircraft sustaining rotor of the type wherein the rotor hub is located above the body of the craft in all normal flight conditions, a lower or driving unit including a main casing for mounting the unit and having shafting and gearing therein for actuation by a prime mover, an aperture at the upper side of said casing, means for supporting a rotor-drive shaft element in said aperture to be driven by said shaft and gearing, and means for altering the angle of said support without changing the position of the rotor hub with respect to the body of the craft.

23. In rotor-starter mechanism of the character described, a lower or driving unit including a main casing for mounting the unit and having shafting and gearing therein for actuation by a prime mover, an aperture at the upper side of said casing, means for supporting a rotor drive-shaft element in said aperture to be ultimately driven by said shafting and gearing, apertures at each side of said main casing, transverse shafting with gearing for connecting the driving shaft and the rotor-shaft element, and bearing means for mounting said transverse shafting in said lateral apertures.

24. In an aircraft rotor-starter mechanism, a driving structure having means of connection with a prime mover and having free-wheel connection to the rotor, a clutch mechanism in the driving structure, and a brake device operable upon disengagement of the clutch mechanism to stop idle rotation of parts of the starter.

25. In an aircraft rotor-starter mechanism, a housing, gearing therein, shafting connected to a gear and extending outwardly for connection to a prime mover, other shafting connected to a gear and extending upwardly for connection with the rotor, and a multiple disc clutch of small diameter for completing the connection, mounted laterally in said housing.

26. In rotor-starter mechanism of the character described, a casing for the major operating parts of the starter, a drive shaft extending into said casing from a prime mover, a driven shaft extending from said casing for connection with the rotor, a disconnectible clutch for completing the connection in said casing, hollow shafting for mounting said clutch and for operating it in one direction, and spring means housed in said hollow shafting and acting to move the clutch in the opposite direction.

27. In a rotor-starter of the character described, the combination of driving connections interposed between the rotor and prime mover, a clutch in said connections, actuating means for engaging the clutch, and a device in said actuating means which is yieldingly extensible to predeterminedly limit the pressure normally exertible upon the clutch.

28. A lower driving unit for a starter of the character described, comprising a casing, a shaft extending outwardly of said casing for connection with a prime mover, a shaft extending upwardly for connection with the rotor, means in said casing for connecting said shafts, and means for removing and replacing operating parts laterally of the casing.

29. A lower driving unit for a starter of the character described, comprising a casing, a shaft extending outwardly of said casing for connection with a prime mover, a shaft extending upwardly for connection with the rotor, means in said casing for connecting said shafts, and means for removing and replacing operating parts laterally of the casing, said last means including a removable lateral casing extension with clutch mechanism mounted therein.

30. A lower driving unit for a starter of the character described, comprising a casing, a shaft extending outwardly of said casing for connection with a prime mover, a shaft extending upwardly for connection with the rotor, means in said casing for connecting said shafts, and means for removing and replacing operating parts laterally of the casing, said last means including a removable lateral casing extension with clutch mechanism mounted therein and removable cap means on said extension for inspection and adjustment of the clutch mechanism.

31. An aircraft including a sustaining rotor, a prime mover, and rotor drive mechanism including operating parts extended from the prime mover to the rotor, clutch means associated with said parts, a casing for at least some of said operating parts including said clutch means, the casing being provided with substantially symmetrically formed apertures in different sides thereof, actuating means for the clutch means, and means for mounting both of said means, whereby at least one of said means may be associated alternatively with either one of said substantially symmetrical apertures.

32. In an aircraft, a sustaining rotor mounted for rotation about a generally upright axis, a prime mover, primary shafting adapted to be driven by the prime mover, another shaft having driving connection with the rotor and with the primary shafting, and means providing for shifting and variously locating said other shaft in different positions with the rotor axis in a substantially predetermined position.

33. In an aircraft, a sustaining rotor mounted for rotation about a generally upright axis, a prime mover, and a rotor starter mechanism including a primary shaft adapted to be driven by the prime mover, another shaft having means of connection with the rotor and adapted to be driven by the primary shaft and means providing for angular shifting of said other shaft without disturbing the driving connection between the prime mover and the rotor, said means also being constructed to provide for the said angular shifting of said other shaft with the rotor axis in a substantially predetermined position.

34. In an aircraft, a sustaining rotor mounted for rotation about a generally upright axis, a forward propulsion engine, and a mechanism for starting the rotor including a casing, a driving device therein having an operating connection with said engine, a drive take-off mechanism adapted to be connected with the driving device and to the rotor including a bearing support, and means for mounting and altering the angle of said bearing support on said casing substantially independently of the position of the rotor axis.

35. An aircraft including in combination with an engine and a sustaining rotor normally positioned to be rotated about a generally upright axis under all flight conditions and to be driven by relative airflow, a rotor starter mechanism adapted to be mounted adjacent the engine and including a longitudinal shaft adapted for connection with the engine, a transverse shaft adapted to be connected with the longitudinal shaft, and an upwardly extended shaft for interconnecting the transverse shaft and the rotor.

36. For an aircraft having a sustaining rotor constituting its primary means of sustension, a rotor-drive mechanism including a prime mover, drive mechanism connected with the rotor, and replaceable adapter means arranged to operatively connect the prime mover and said drive mechanism and to support at least a portion of the drive mechanism on the prime mover, whereby the drive from the prime mover to the rotor may be completed through various engine adapters.

37. For an aircraft having a sustaining rotor constituting its primary means of sustension, a rotor-drive mechanism including a prime mover, drive mechanism connected with the rotor and a replaceable gear-box adapter mechanism arranged to operatively connect the prime mover and said drive mechanism and to support at least a portion of the drive mechanism on the prime mover, whereby the drive from the prime mover to the rotor may be completed through various adapter mechanisms.

38. In an aircraft, a forward propulsion engine, a sustaining rotor mounted above the engine for rotation about a generally upright axis, and a rotor starter including a power take-off shaft for connection with the propulsion engine, a power delivery shaft extended upwardly for connection with the rotor, the power take-off and power delivery shafts being located substantially in the same general vertical plane, and shafting extended transverse the said plane and having gearing connecting the same with the take-off and delivery shaft.

39. In an aircraft, a forward propulsion engine, a sustaining rotor mounted above the engine for rotation about a generally upright axis, and a rotor starter including a power take-off shaft for connection with the propulsion engine, a power delivery shaft extended upwardly for connection with the rotor, the power take-off and power delivery shafts being located substantially in the same general vertical plane, shafting extended transverse the said plane and having gearing connecting the same with the take-off and delivery shaft, and a clutch mechanism associated with the transverse shafting.

40. A rotor starter including a power take-off shaft for connection with a prime mover, a power delivery shaft for connection with an aircraft rotor, and a mechanism for connecting said shafts including a clutch device and a gear, the shafts, clutch device and gear being mounted and arranged to provide for reversal of the position of the gear to reverse the relative direction of rotation of said shafts while maintaining said clutch device in a substantially predetermined relation to said shafts.

41. In a rotor-starter of the character described, the combination of driving connections interposed between the rotor and prime mover, a clutch in said connections, actuating means for engaging the clutch including parts operatively associated therewith, stop means positively limiting the degree of clutch engagement by said actuating means, clutch wear compensating means, and a yielding device in said actuating means adapted to predeterminatively limit the pressure normally exertible upon the clutch and said associated parts.

42. In combination, a prime mover and an aircraft rotor, a clutch-and-driving-unit interposed between the prime mover and the rotor including driving connections with said prime mover and said rotor, a housing forming part of said unit with clutch and driving parts therein, and means for alternatively mounting said clutch in the housing in different positions with relation to such driving parts.

43. In combination, a prime mover and an aircraft rotor, a clutch-and-driving-unit interposed between the prime mover and the rotor including driving connections with said prime mover and said rotor, clutch-operating means, means for mounting the latter upon said unit, and means for shifting the mounting to either of a plurality of positions with respect to the unit.

44. In combination, a prime mover and an aircraft rotor, a clutch-and-driving-unit interposed between the prime mover and the rotor including driving connections with said prime mover and said rotor, a frame or casing forming a part of said unit, clutch-operating means, and means for adjustably mounting said operating means on said frame or casing for actuation from different directions.

45. In an aircraft, the combination of a forward propulsion engine, an aerodynamically-actuable sustaining rotor, shafting extending generally horizontally from said engine and connected for take-off of power therefrom, shafting extending generally upwardly to said rotor and connected for the delivery of power thereto, means for varying the length of at least one of said shaftings, and means for drivingly coupling said shaftings with different adjustments of said length varying means.

46. In an aircraft, the combination of a forward propulsion engine, an aerodynamically-actuable sustaining rotor, shafting extending generally horizontally from said engine and connected for take-off of power therefrom, shafting extending generally upwardly to said rotor and connected for the delivery of power thereto, means for varying the relative angularity of said shaftings, and means for drivingly coupling said shaftings in different adjusted positions of the angle varying means.

JOSEPH S. PECKER.